(12) United States Patent
Whitehead et al.

(10) Patent No.: US 7,388,539 B2
(45) Date of Patent: Jun. 17, 2008

(54) CARRIER TRACK LOOP FOR GNSS DERIVED ATTITUDE

(75) Inventors: Michael L. Whitehead, Scottsdale, AZ (US); Cary Davis, Cave Creek, AZ (US)

(73) Assignee: Hemisphere GPS Inc., Calgary, Alberta (CA)

( * ) Notice: Subject to any disclaimer, the term of this patent is extended or adjusted under 35 U.S.C. 154(b) by 245 days.

(21) Appl. No.: 11/253,871

(22) Filed: Oct. 19, 2005

(65) Prior Publication Data

US 2007/0085738 A1    Apr. 19, 2007

(51) Int. Cl.
*G01S 1/00* (2006.01)

(52) U.S. Cl. ............... 342/357.12; 342/357.04; 342/357.11

(58) Field of Classification Search ......... 342/357.04, 342/357.06, 357.07, 357.11, 357.12; 701/213, 701/215

See application file for complete search history.

(56) References Cited

U.S. PATENT DOCUMENTS

| | | |
|---|---|---|
| 3,727,710 A | 4/1973 | Sanders et al. |
| 3,899,028 A | 8/1975 | Morris et al. |
| 4,132,272 A | 1/1979 | Holloway et al. |
| 4,180,133 A | 12/1979 | Collogan et al. |
| 4,453,614 A | 6/1984 | Allen et al. |
| 4,637,474 A | 1/1987 | Leonard |
| 4,802,545 A | 2/1989 | Nystuen et al. |
| 4,858,132 A | 8/1989 | Holmquist |
| 4,918,607 A | 4/1990 | Wible |
| 5,031,704 A | 7/1991 | Fleischer et al. |
| 5,134,407 A | 7/1992 | Lorenz et al. |
| 5,152,347 A | 10/1992 | Miller |
| 5,156,219 A | 10/1992 | Schmidt et al. |
| 5,185,610 A | 2/1993 | Ward et al. |
| 5,202,829 A | 4/1993 | Geier |
| 5,207,239 A | 5/1993 | Schwitaia |
| 5,255,756 A | 10/1993 | Follmer et al. |

(Continued)

FOREIGN PATENT DOCUMENTS

| | | |
|---|---|---|
| WO | WO98/36288 | 8/1998 |
| WO | WO0024239 | 5/2000 |
| WO | WO03019430 | 3/2003 |
| WO | WO2005/119386 | 12/2005 |

OTHER PUBLICATIONS

"International Search Report and Written Opinion", PCT/US2004/015678, filed May 17, 2004, mailed Jun. 21, 2005.

(Continued)

*Primary Examiner*—Doa L. Phan
(74) *Attorney, Agent, or Firm*—Mark E. Brown

(57) ABSTRACT

A method and system for reducing Global Navigation Satellite System (GNSS) carrier tracking loop ambiguities comprising: receiving a plurality of GNSS satellite signals with a first antenna in operable communication with a first tracking device and a second antenna in communication with a second tracking device in at least one GNSS receiver; and sharing of data between the first tracking device and the second tracking device. The sharing is configured to facilitate a commonality in a carrier phase derived in the first and second tracking devices. The sharing also results in a cancellation of the commonality when a difference phase is formed between a carrier phase from the first tracking device and a carrier phase from the second tracking device.

20 Claims, 8 Drawing Sheets

U.S. PATENT DOCUMENTS

| | | | |
|---|---|---|---|
| 5,268,695 A * | 12/1993 | Dentinger et al. | 342/357.11 |
| 5,296,861 A | 3/1994 | Knight | |
| 5,343,209 A | 8/1994 | Sennott et al. | |
| 5,369,589 A | 11/1994 | Steiner | |
| 5,375,059 A | 12/1994 | Krytsos et al. | |
| 5,390,125 A | 2/1995 | Sennott et al. | |
| 5,416,712 A | 5/1995 | Geier et al. | |
| 5,476,147 A | 12/1995 | Fixemer | |
| 5,491,636 A | 2/1996 | Robertson | |
| 5,511,623 A | 4/1996 | Frasier | |
| 5,534,875 A | 7/1996 | Diefes et al. | |
| 5,543,804 A | 8/1996 | Buchler et al. | |
| 5,546,093 A | 8/1996 | Gudat et al. | |
| 5,548,293 A | 8/1996 | Cohen | |
| 5,561,432 A | 10/1996 | Knight | |
| 5,592,382 A | 1/1997 | Colley | |
| 5,610,845 A | 3/1997 | Slabinski | |
| 5,612,883 A | 3/1997 | Shaffer et al. | |
| 5,615,116 A | 3/1997 | Gudat et al. | |
| 5,617,317 A | 4/1997 | Ignagni | |
| 5,644,139 A | 7/1997 | Allen et al. | |
| 5,564,632 A | 9/1997 | Walker | |
| 5,664,632 A | 9/1997 | Frasier | |
| 5,684,696 A | 11/1997 | Rao et al. | |
| 5,691,974 A * | 11/1997 | Zehavi et al. | 370/203 |
| 5,717,593 A | 2/1998 | Gvili | |
| 5,725,230 A | 3/1998 | Walkup | |
| 5,757,316 A | 5/1998 | Buchler | |
| 5,765,123 A | 6/1998 | Nimura et al. | |
| 5,777,578 A | 7/1998 | Chang et al. | |
| 5,810,095 A | 9/1998 | Orbach et al. | |
| 5,838,562 A | 11/1998 | Gudat et al. | |
| 5,862,501 A | 1/1999 | Talbot et al. | |
| 5,875,408 A | 2/1999 | Bendett et al. | |
| 5,918,558 A | 7/1999 | Susag | |
| 5,923,270 A | 7/1999 | Sampo et al. | |
| 5,928,309 A | 7/1999 | Korver et al. | |
| 5,933,110 A | 8/1999 | Tang | |
| 5,935,183 A | 8/1999 | Sahm et al. | |
| 5,940,026 A | 8/1999 | Popeck | |
| 5,943,008 A | 8/1999 | Dusseldorp | |
| 5,945,917 A | 8/1999 | Harry | |
| 5,956,250 A | 9/1999 | Gudat et al. | |
| 5,969,670 A | 10/1999 | Kalafus et al. | |
| 5,987,383 A | 11/1999 | Keller | |
| 6,014,608 A | 1/2000 | Seo | |
| 6,052,647 A | 4/2000 | Parkinson et al. | |
| 6,057,800 A | 5/2000 | Yang et al. | |
| 6,061,390 A | 5/2000 | Meehan et al. | |
| 6,062,317 A | 5/2000 | Gharsalli | |
| 6,069,583 A * | 5/2000 | Silvestrin et al. | 342/357.01 |
| 6,076,612 A | 6/2000 | Carr et al. | |
| 6,122,595 A | 9/2000 | Varley et al. | |
| 6,150,978 A | 11/2000 | McBurney | |
| 6,191,730 B1 * | 2/2001 | Nelson, Jr. | 342/357.05 |
| 6,191,733 B1 | 2/2001 | Dizchavez | |
| 6,198,992 B1 | 3/2001 | Winslow | |
| 6,199,000 B1 | 3/2001 | Keller et al. | |
| 6,205,401 B1 | 3/2001 | Pickhard et al. | |
| 6,229,479 B1 | 5/2001 | Kozlov et al. | |
| 6,233,511 B1 | 5/2001 | Berger et al. | |
| 6,236,916 B1 | 5/2001 | Staub et al. | |
| 6,236,924 B1 | 5/2001 | Motz | |
| 6,253,160 B1 | 6/2001 | Hanseder | |
| 6,256,583 B1 | 7/2001 | Sutton | |
| 6,259,398 B1 | 7/2001 | Riley | |
| 6,285,320 B1 | 9/2001 | Olster et al. | |
| 6,292,132 B1 | 9/2001 | Wilson | |
| 6,313,788 B1 | 11/2001 | Wilson | |
| 6,313,789 B1 | 11/2001 | Zhodzishsky et al. | |
| 6,314,348 B1 | 11/2001 | Winslow | |
| 6,325,684 B1 | 12/2001 | Knight | |
| 6,345,231 B2 | 2/2002 | Quincke | |
| 6,377,889 B1 | 4/2002 | Soest | |
| 6,389,345 B2 | 5/2002 | Phelps | |
| 6,397,147 B1 | 5/2002 | Whitehead | |
| 6,421,003 B1 | 7/2002 | Riley et al. | |
| 6,431,576 B1 | 8/2002 | Viaud et al. | |
| 6,434,462 B1 | 8/2002 | Bevly et al. | |
| 6,445,983 B1 | 9/2002 | Dickson et al. | |
| 6,445,990 B1 | 9/2002 | Manring | |
| 6,463,374 B1 | 10/2002 | Keller et al. | |
| 6,466,871 B1 | 10/2002 | Reisman et al. | |
| 6,469,663 B1 | 10/2002 | Whitehead et al. | |
| 6,501,422 B1 | 12/2002 | Nichols | |
| 6,515,619 B1 | 2/2003 | McKay, Jr. | |
| 6,539,303 B2 | 3/2003 | McClure et al. | |
| 6,542,077 B2 | 4/2003 | Joao | |
| 6,553,299 B1 | 4/2003 | Keller et al. | |
| 6,553,311 B2 | 4/2003 | Aheam et al. | |
| 6,556,942 B1 * | 4/2003 | Smith | 702/150 |
| 6,577,952 B2 | 6/2003 | Geier et al. | |
| 6,587,761 B2 | 7/2003 | Kumar | |
| 6,611,228 B2 | 8/2003 | Toda et al. | |
| 6,622,091 B2 | 9/2003 | Perlmutter et al. | |
| 6,631,916 B1 | 10/2003 | Miller | |
| 6,643,576 B1 | 11/2003 | O'Connor et al. | |
| 6,646,603 B2 | 11/2003 | Dooley et al. | |
| 6,657,585 B1 | 12/2003 | Kucik | |
| 6,671,587 B2 | 12/2003 | Hrovat et al. | |
| 6,688,403 B2 | 2/2004 | Bernhardt et al. | |
| 6,703,973 B1 | 3/2004 | Nichols | |
| 6,711,501 B2 | 3/2004 | McClure et al. | |
| 6,775,802 B2 | 8/2004 | Gaal | |
| 6,792,380 B2 | 9/2004 | Toda | |
| 6,865,465 B2 | 3/2005 | McClure | |
| 6,922,635 B2 | 7/2005 | Rorabaugh | |
| 7,027,918 B2 | 4/2006 | Zimmerman et al. | |
| 7,031,725 B2 | 4/2006 | Rorabaugh | |
| 7,162,348 B2 | 1/2007 | McClure et al. | |
| 2002/0029110 A1 | 3/2002 | Fukuda et al. | |
| 2002/0038171 A1 | 3/2002 | Deguchi et al. | |
| 2002/0072850 A1 | 6/2002 | McClure et al. | |
| 2002/0165648 A1 | 11/2002 | Zeitler | |
| 2002/0165669 A1 | 11/2002 | Pinto et al. | |
| 2002/0169553 A1 | 11/2002 | Perimutter et al. | |
| 2002/0175858 A1 | 11/2002 | Takahashi | |
| 2003/0009282 A1 | 1/2003 | Upadhyaya et al. | |
| 2003/0187560 A1 | 10/2003 | Keller et al. | |
| 2004/0186644 A1 | 9/2004 | McClure et al. | |
| 2004/0210357 A1 | 10/2004 | McKay et al. | |
| 2004/0212533 A1 | 10/2004 | Whitehead | |
| 2005/0116859 A1 * | 6/2005 | Miller et al. | 342/357.09 |
| 2006/0251173 A1 * | 11/2006 | Wang et al. | 375/240.24 |

OTHER PUBLICATIONS

"ISO", 11783 Part 7 Draft Amendment 1 Annex, Paragraphs B.6 and B.7.ISO 11783-7 2004 DAM1, ISO: Mar. 8, 2004.

Kaplan, E D., "Understanding GPS: Principles and Applications", Artech House, MA, 1996.

Irsigler, M et al., "PPL Tracking Performance in the Presence of Oscillator Phase Noise", GPS Solutions, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", 11th Int. Tech Meeting of the Satellite Division of the U.S. Inst. of Navigation, Nashville, TN, Sep. 15-18, 783-795, 1998.

* cited by examiner

CARRIER TRACK LOOP FOR GNSS DERIVED ATTITUDE

FIELD OF THE INVENTION

The invention relates generally to precision GNSS location or attitude systems. More specifically, the invention relates to systems that utilize Global Navigation Satellite System (GNSS) signals to infer differential path length of carrier signals arriving at two or more antennas.

BACKGROUND OF THE INVENTION

The determination of the orientation of an object's axes relative to a reference system is often of interest. Depending on the application, the orientation and reference system may be in two dimensions (2D) or in three dimensions (3D). In the case of two-dimensional systems, terms such as azimuth, heading, elevation, pitch, and inclination may be used in place of attitude.

There are many techniques in use to measure 2D and 3D attitude. Common techniques include using a magnetic compass to reference the object of interest to the local gravitational field, optical techniques to reference the object of interest to an earth-based or star-based reference frame, accelerometers to measure relative attitude or changes in attitude, and optical and mechanical gyroscopes for also measuring relative attitude. The merits of each technique are best judged according to the specific application or use. Likewise, each technique also exhibits disadvantages that may include accuracy, cost, and ease of use.

Recently, attitude determination using highly accurate space-based radio navigation systems has become possible. Such a radio navigation system is commonly referred to as a Global Navigation Satellite System (GNSS). A GNSS includes a network of satellites that broadcast radio signals, enabling a user to determine the location of a receiving antenna with a high degree of accuracy. To determine the attitude of an object, it is simply necessary to determine the position of two or more receiving antennas that have known placements relative to an object. Examples of GNSS systems include Navstar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; and Galileo, also similar to GPS but created by the European Community and slated for full operational capacity in 2008.

Should it be necessary to improve the accuracy, reliability, or confidence level of an attitude or position determined through use of a GNSS, a Satellite-Based Augmentation System (SBAS) may be incorporated if one that is suitable is available. There are several public SBAS that work with GPS. These include Wide Area Augmentation System (WAAS), developed by the United States' Federal Aviation Authority, European Geostationary Navigation Overlay Service (EGNOS), developed by the European Community, as well as other public and private pay-for-service systems.

Currently the best-known of the available GNSS, GPS was developed by the United States government and has a constellation of 24 satellites in 6 orbital planes at an altitude of approximately 26,500 km. The first satellite was launched in February 1978. Initial Operational Capability (IOC) for the GPS was declared in December 1993. Each satellite continuously transmits microwave L-band radio signals in two frequency bands, L1 (1575.42 MHz) and L2 (1227.6 MHz). The L1 and L2 signals are phase shifted, or modulated, by one or more binary codes. These binary codes provide timing patterns relative to the satellite's onboard precision clock (synchronized to other satellites and to a ground reference through a ground-based control segment), in addition to a navigation message giving the precise orbital position of each satellite, clock correction information, and other system parameters.

The binary codes providing the timing information are called the C/A Code, or coarse acquisition code, and the P-code, or precise code. The C/A Code is a 1 MHz Pseudo Random Noise (PRN) code modulating the phase of the L1 signal and repeating every 1023 bits (one millisecond). The P-Code is also a PRN code, but modulates the phase of both the L1 and L2 signals and is a 10 MHz code repeating every seven days. These PRN codes are known patterns that can be compared to internal versions in the receiver. The GNSS receiver is able to compute an unambiguous range to each satellite by determining the time-shift necessary to align the internal code to the broadcast code. Since both the C/A Code and the P-Code have a relatively long "wavelength"—approximately 300 meters (or 1 microsecond) for the C/A Code and 30 meters (or 1/10 microsecond) for the P-Code, positions computed using them have a relatively coarse level of resolution.

To improve the positional accuracy provided by use of the C/A Code and the P-Code, a receiver may take advantage of the carrier component of the L1 or L2 signal. The term "carrier", as used herein, refers to the dominant spectral component remaining in the radio signal after the spectral content resulting from the modulating PRN digital codes has been removed (e.g., from the C/A Code and the P-Code). The L1 and L2 carrier signals have wavelengths of about 19 centimeters and 24 centimeters, respectively. The GPS receiver is able to track these carrier signals and measure the carrier phase to a small fraction of a complete wavelength, permitting range measurement to an accuracy of less than a centimeter.

A technique to improve accuracy is realized by differencing GPS range measurements—known as Differential GPS (DGPS). The combination of DGPS with precise measurements of carrier phase leads to differential position accuracies of less than one centimeter root-mean-squared (i.e., centimeter-level positioning). Such accuracies are sufficient to determine the attitude of an object with 2 or more GPS GNSS antennas, typically spaced from 0.2 meters to 2 meters apart.

Accurate differential carrier phase is a primary concern for attitude determination or other precise GNSS positioning. Carrier phase data is available by tracking the carrier phase on either the L1 or L2 GPS signal. Navigation data is BPSK modulated onto both the L1 and the L2 carrier at a 50 Hz rate and, as such, the input carrier phase is subject to a 180 degree phase reversal every 20 milliseconds and the absolute phase can be inverted. The data modulation is removed from the carrier by means of a tracking loop known as a Costas loop.

A Costas loop results in a 180 degree phase ambiguity. That is, the Costas loop is just as likely to phase lock so that the binary 1's come out as binary 0's, and vice versa. The 180 degree phase ambiguity is of concern since it introduces an ambiguity of ½ of a carrier wavelength in the measured carrier phase. The wavelength of the L1 carrier is about 19 cm and the ½ cycle ambiguity is thus equivalent to 9.5 cm of measured phase.

Typically, in GPS receivers, the ½ cycle ambiguity is resolved by looking at certain data bits within the navigation message that are of a known value. If the bit is inverted over its known value, then the Costas loop is locked to the opposite phase and ½ cycle's worth of phase must be added to (or subtracted from) the measured carrier phase in order to maintain whole cycle phase alignment. It is of little consequence whether the ½ cycle is added or subtracted from the measured phase since, regardless, a whole cycle ambiguity is still present that must be removed by methods such as those described in U.S. Pat. No. 6,469,663 and/or U.S. patent application Ser. No. 11/243,112, entitled Attitude Determination Exploiting Geometry Constraints, to Whitehead et al., filed Oct. 4, 2005.

One problem that arises is that known data bits, such as those in the navigation message's preamble, arrive only so often. For example, the preamble itself is sent once every six seconds as the start of a 300 bit long sub-frame (see ICD-GPS-200). Other bits within the navigation message are known, or can be inferred from past data, but there are still many bits which are not known or which may not be predicted with 100% confidence. If the Costas loop is stressed (due to multipath fading, foliage attenuation, signal blockage, and the like) while the unknown bits are arriving, it may undergo a 180 degree phase shift that is not immediately detected. Hence, a ½ cycle error will arise in the measured phase that will persist until the next known data bit arrives. This may then reduce the accuracy in heading, pitch, or roll if the measured phase is used in an attitude determining device.

A further complication of a Costas loop is that the probability for a cycle slip is significantly higher when using a Costas loop as opposed to a conventional Phase Lock Loop (PLL). This is because the Costas loop is mathematically equivalent to a squaring loop that tracks the carrier phase at twice the carrier frequency. Phase tracking errors greater than 90 degrees may cause cycle slips in a Costas loop whereas phase errors of up to 180 degrees may be tolerated when using a PLL.

In an attitude system, such as that disclosed in Whitehead et al., the carrier phases arriving at two or more separate antennas are differenced with one another to create a differential carrier phase. The process of taking the difference cancels common mode errors such as satellite clock error and errors caused by propagation delays as the GNSS signal travels through the ionosphere and troposphere.

What is needed then is a Costas loop method that results in common ½ cycle ambiguity for carrier phases measured at both a master antenna and one or more slave antennas for a particular satellite. Being common, the ½ cycle ambiguity will cancel in the differential carrier phase.

Secondly, what is also needed is a method to make up for the loss of performance of a Costas loop over a conventional PLL. Again, since differencing is deployed, it is desirable that any cycle slips that arise on a carrier signal tracked from one antenna be present in the carrier signal tracked by a different antenna. Such cycle slips will cancel in the difference and will not affect the attitude or heading.

Thirdly, a method is needed that yields common, noise-induced effects in each individually tracked carrier phase so that the common-mode effects cancel in the differential carrier phase. A method with the aforementioned properties is applied to carrier tracking loops receiving data at two or more antennas that experience roughly similar motion or motion for which relative dynamic effects are low. The method further has the ability to track rapid clock-induced carrier phase when a common clock is employed.

SUMMARY OF THE INVENTION

Disclosed herein in an exemplary embodiment is a method of reducing Global Navigation Satellite System (GNSS) carrier tracking loop ambiguities comprising: receiving a plurality of GNSS satellite signals with a first antenna in operable communication with a first tracking device and a second antenna in communication with a second tracking device in at least one GNSS receiver; and sharing of data between the first tracking device and the second tracking device. The sharing is configured to facilitate a commonality in a carrier phase derived in the first and second tracking devices. The sharing also results in a cancellation of the commonality when a difference phase is formed between a carrier phase from the first tracking device and a carrier phase from the second tracking device.

Also disclosed herein in yet another exemplary embodiment is a system for reducing Global Navigation Satellite System (GNSS) carrier tracking loop ambiguities comprising: a first antenna in operable communication with a first tracking device configured to receive a plurality of GNSS satellite signals; and a second antenna in communication with a second tracking device configured to receive a plurality of GNSS satellite signals. The first tracking device and the second tracking device operable in at least one GNSS receiver. The first tracking device and the second tracking device are configured to share data therebetween to facilitate a commonality in a carrier phase derived in the first tracking device and the second tracking device. A difference phase is formed between a carrier phase from the first tracking device and another carrier phase from the second tracking device resulting in a cancellation of the commonality.

Further disclosed herein in another exemplary embodiment is a system for reducing Global Navigation Satellite System (GNSS) carrier tracking loop ambiguities comprising: means for receiving a plurality of GNSS satellite signals with a first antenna in operable communication with a first tracking device and a second antenna in communication with a second tracking device in at least one GNSS receiver. The system also includes means for sharing of data between the first tracking device and the second tracking device, the sharing configured to facilitate a commonality in a carrier phase derived in the first tracking device and the second tracking device. The sharing resulting in a cancellation in the commonality when a difference phase is formed between a carrier phase from the first tracking device and another carrier phase from the second tracking device.

Disclosed herein in yet another exemplary embodiment is a storage medium encoded with a machine-readable computer program code, the storage medium including instructions for causing a computing system to implement the abovementioned method for reducing Global Navigation Satellite System (GNSS) carrier tracking loop ambiguities.

Further, disclosed herein in yet another exemplary embodiment is a computer data signal, the computer data signal comprising code configured to cause a processor to implement the abovementioned method for reducing Global Navigation Satellite System (GNSS) carrier tracking loop ambiguities.

The invention also features a method for attitude determination or other differential GNSS positioning applications that is effective at reducing the occurrence of ½ ambiguities and cycle slips in the differential carrier phase. In an exemplary embodiment, this is accomplished by sharing information in the Costas tracking loops, designating one tracking device as a master while other slave tracking devices are driven by a carrier discriminator employing the master's in-phase in place of the slave's own in-phase data as is typically done. A related invention yields the benefit of partially canceling common noise-induced effects in differential carrier phase measured between two antennas.

Additional features, functions, and advantages associated with the disclosed methodology will be apparent from the detailed description which follows, particularly when reviewed in conjunction with the figures appended hereto.

BRIEF DESCRIPTION OF THE DRAWINGS

To assist those of ordinary skill in the art in making and using the disclosed embodiments, reference is made to the appended figures, wherein like references are generally numbered alike in the several figures.

DETAILED DESCRIPTION

An exemplary embodiment of invention features a method and system for attitude determination or other GNSS positioning that significantly reduces the adverse effects of cycle slips and, simultaneously, problems resulting from ½ cycle phase ambiguities, such as may be encountered when employing a tracking loop, e.g., a phase tracking loop.

A preferred embodiment of the invention, by way of illustration, is described herein as it may be applied to attitude determination. While a preferred embodiment is shown and described by illustration and reference to attitude determination, it will be appreciated by those skilled in the art that the invention is not limited to attitude determination alone and may be applied to control systems, navigation, and the like, as well as combinations thereof. An embodiment of the invention as described herein may readily be applied to attitude determination as described in commonly assigned U.S. patent application Ser. No. 11/243,112, entitled Attitude Determination Exploiting Geometry Constraints, filed Oct. 4, 2005, the contents of which are incorporated by reference herein in their entirety.

It will further be appreciated that, while particular sensors, antennas, receivers and the like nomenclature associated therewith are enumerated to describe an exemplary embodiment, such terminology is utilized and described for illustration only and are not limiting. Numerous variations, substitutes, and equivalents will be apparent to those contemplating the disclosure herein.

Figure 1:
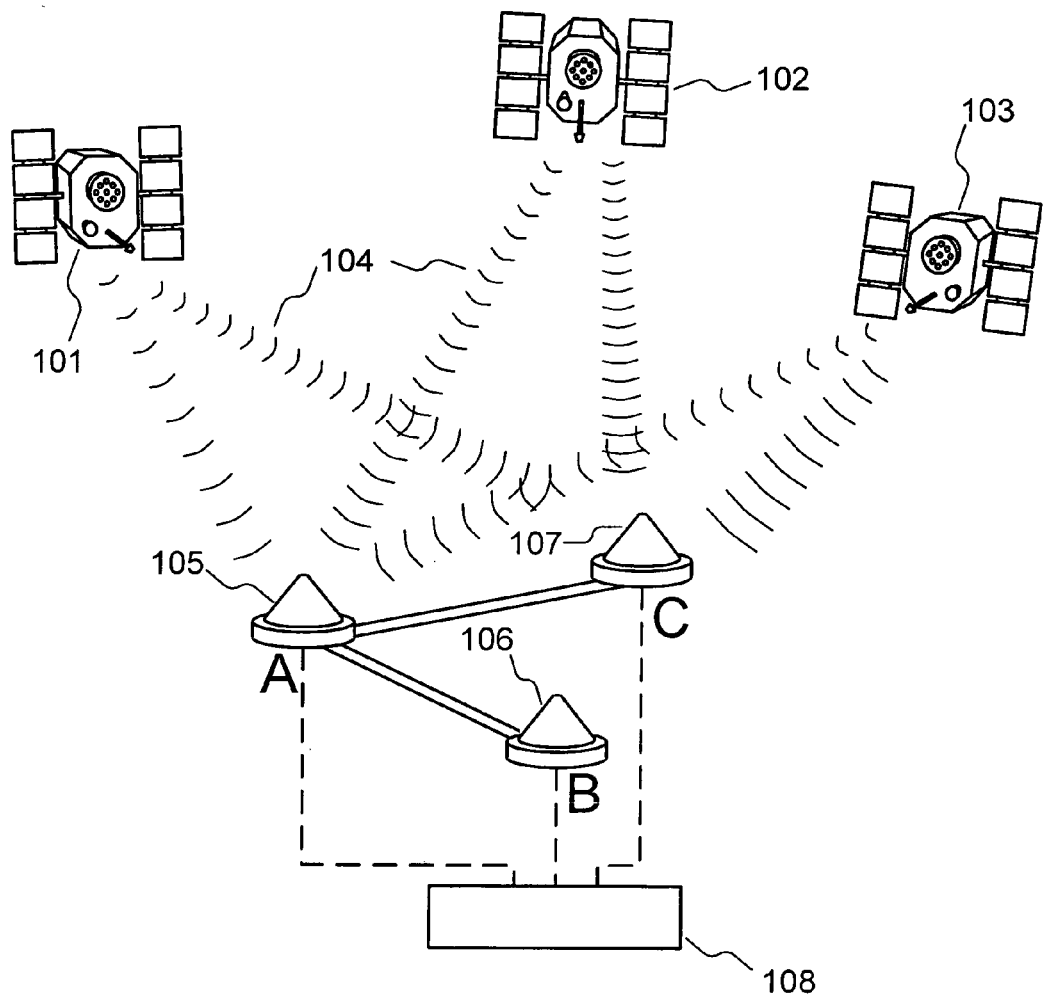
FIG. 1 is a diagram showing the use of GNSS satellites in an attitude determining system.

FIG. 1 depicts an exemplary embodiment of an attitude determining system 100 tracking a plurality of GNSS satellites, 101 through 103. The attitude determining hardware system 100 includes the use of three antennas to receive GNSS signals. Each satellite broadcasts a radio frequency signal 104 that is picked up by two or more antennas, three of which are shown as 105 through 107 in FIG. 1. The signal then travels from each antenna into the receiver unit 108 where it is down-converted and digitally sampled so that it may be tracked by the receiver's digital tracking loops. Various timing and navigation information is readily extracted while tracking the signal, including the phase of a Pseudo Random Noise (PRN) code timing pattern that is modulated on the signal, the phase of the signal's carrier, and navigation data from which the location of the satellite may be computed. It will be appreciated that while three antennas are depicted, more could be employed if desired, especially for redundancy.

In order to perform the prescribed functions and desired processing, as well as the computations therefor (e.g., the attitude determination processes, and the like), the receiver 108 may include, but not be limited to, a processor(s), computer(s), memory, storage, register(s), timing, interrupt(s), communication interface(s), and input/output signal interfaces, and the like, as well as combinations comprising at least one of the foregoing. For example, receiver 108 may include signal interfaces to enable accurate down-conversion and digitally sampling and tracking of satellite signals as needed to facilitate extracting the various timing and navigation information, including, but not limited to, the phase of the PRN code timing pattern. Additional features of the system 100, receiver 108 and the like, are thoroughly discussed herein.

Figure 2:
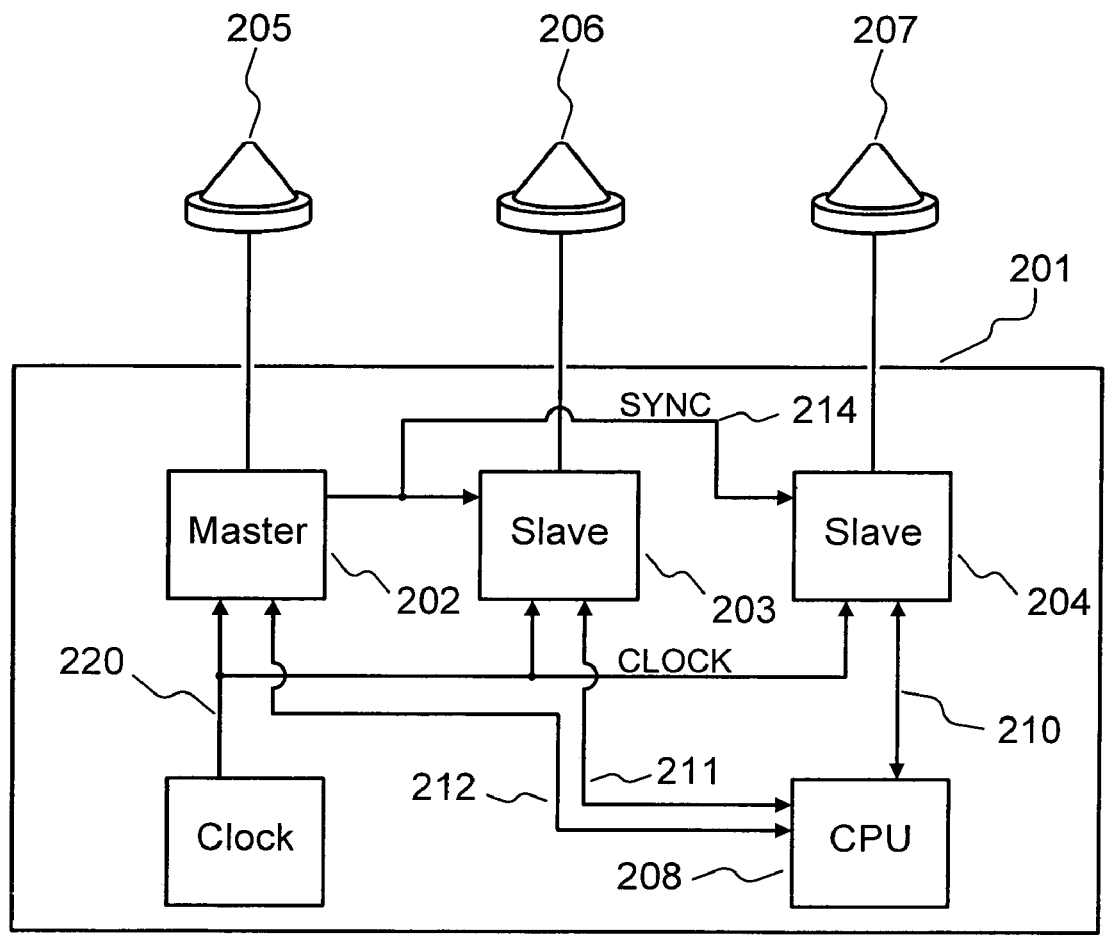
FIG. 2 is a schematic showing an attitude determining system embodiment of an exemplary embodiment of the present invention.

One exemplary embodiment of an attitude determining system 100 shown in FIG. 2 uses a single receiver unit 201 containing multiple synchronized tracking devices, 202 through 204, with each tracking device associated with exactly one antenna (205, 206, and 207). Each tracking device 202, 203, and 204 is capable of tracking a plurality of satellites e.g., 101, 102, and 103. Twelve or more satellites may be tracked. The tracking devices 202, 203, and 204 serve the function of down converting the received Radio Frequency (RF) signals 104 arriving from the plurality of satellites e.g., 101, 102, and 103, sampling the composite signal, and performing high-speed digital processing on the composite signal (such as correlations with a PRN reference signal) that allow the code and carrier phase of each satellite to be tracked. An example of such synchronized tracking devices 202, 203, and 204 is described in commonly assigned U.S. patent application Ser. No. 11/029,809 entitled Method and System for Synchronizing Multiple Tracking Devices For A Geo-location System, filed Jan. 5, 2005, which is a continuation-in-part of U.S. patent application Ser. No. 10/828,745 entitled Method And System For Satellite Based Phase Measurements For Relative Positioning of Fixed Or Slow Moving Points in Close Proximity, filed Apr. 21, 2004, the contents of which are incorporated by reference herein in their entirety. Each tracking device, e.g., 202, 203, and 204 is connected to a single shared computer processing unit (CPU) 208. The CPU 208 sends control commands 210, 211, and 212 respectively to the plurality of tracking devices 202, 203, and 204 that enable them to track the various GNSS satellites, e.g., 101, 102, and 103. The CPU 208 receives back from the tracking device code and carrier phase measurements of the various satellite signals.

A synchronization signal 214, denoted as sync, sent by the master tracking device 202 to the slave tracking devices 203 and 204 allows the master tracking device 202 and slave tracking devices 203, 204 to measure the code and carrier phase of each satellite signal 104 simultaneously. Furthermore, the RF down conversion within each tracking device 202, 203, and 204 and the sampling of data by each device is done using a common clock signal 220. When a single-difference phase observation is formed by subtracting the carrier (or code) phase measured by one tracking device with that measured by another tracking device for the same satellite, the portion of the phase due to the receiver's clock error is essentially eliminated in the difference.

The use of a single CPU connected to multiple shared synchronized tracking devices is advantageous. Data is easily shared among the tracking loops, and the carrier phase tracking loop may thus use a modified Costas loop. For any tracked satellite, e.g., 101, 102, 103, the in-phase reading from the Costas loop of a "master" tracking device, e.g., 202, dictates the sign of the quadrature-phase error discriminator not only for itself, but also for the discriminator of Costas loops in the remaining "slave" tracking devices, e.g., 203, 204. This forces the half-cycle phase ambiguity that is inherent in Costas tracking loops to be the same across all tracking devices for any given satellite so that it cancels when forming single-difference phase observations. Advantageously in this approach, the ambiguity is eliminated more quickly than methods that must wait to decode known navigation data bits that occur in headers or other parts of the navigation data.

Figure 3:
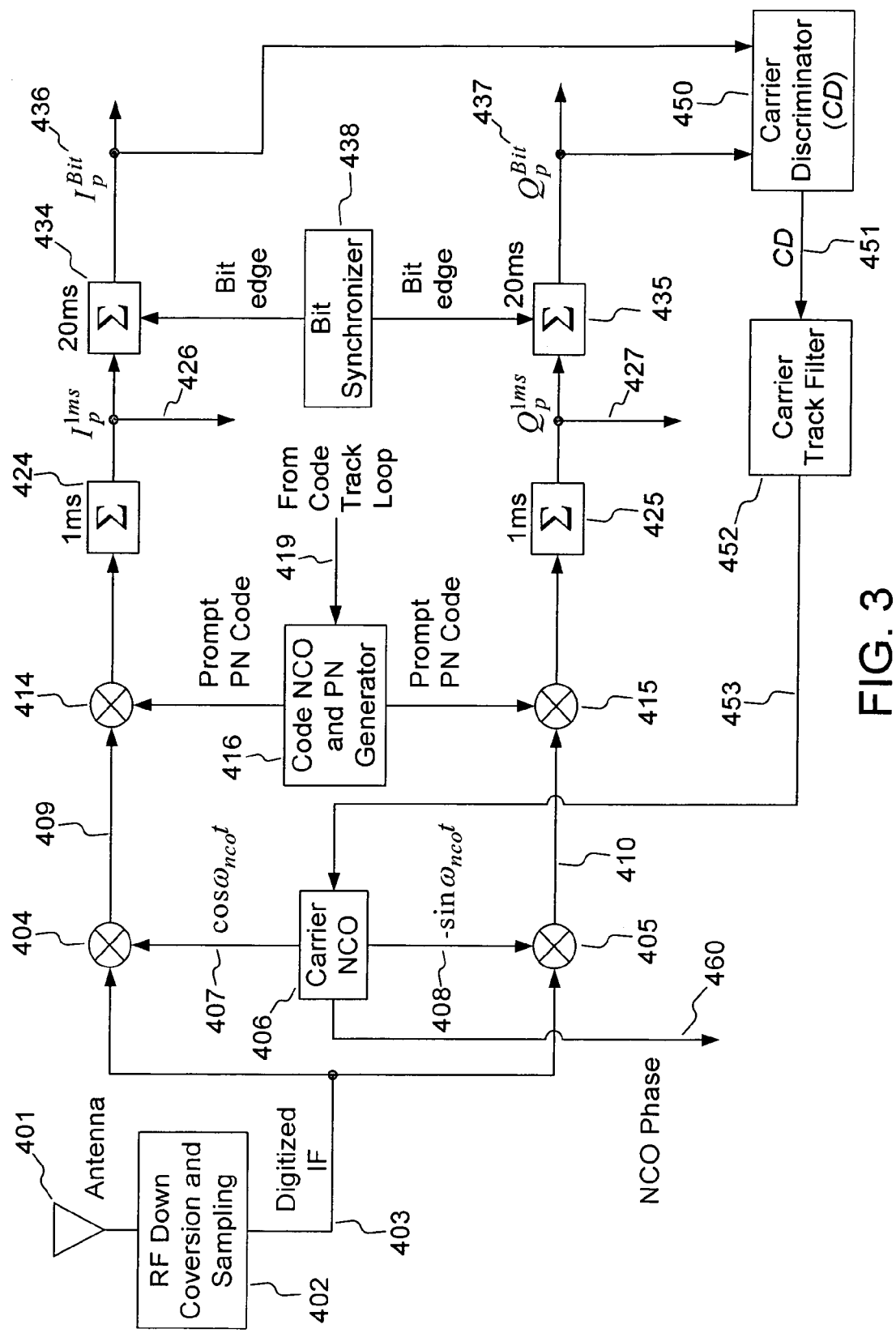
FIG. 3 is a block diagram of a carrier phase tracking and measuring system employing a Costas loop.

FIG. 3 shows a Costas loop as may be employed for tracking the carrier signal in a GPS receiver in accordance with an exemplary embodiment. To simplify the figure and discussion, only the prompt channel is considered, as this is what is relevant to carrier tracking. The signal arrives at the antenna 401 and passes to the RF down conversion and sampling module 402. This results in an output of digitized IF sampled signal denoted by reference numeral 403. The digitized IF signal 403 is mixed down to baseband by two multipliers 404 and 405 each driven by the numerically controlled oscillator (NCO) 406. The NCO is an address generator with sine/cosine lookup tables. The cosine signal 407 is kept in phase alignment with the carrier at its digitized IF. The sine signal 408 is at 90 degrees phase offset (quadrature phase) relative to the carrier at IF. Thus, the upper signal 409 is called the in-phase signal and the lower signal 410 is called the quadrature-phase signal.

In addition to driving the signals to baseband, the spreading Pseudo Random Noise (PN or PRN) sequence must be removed from the received signal (e.g., CA code spreads the L1 GPS signal). As depicted in the figure, this is accomplished by multipliers 414 and 415 which multiply the incoming signal by a replica model of the PN code that is generated by the Code NCO and PN generator 416. In the case of carrier tracking (as opposed to code tracking), the replica model is called the prompt PN code since it is steered by the code track-loop command 419 to align as closely as possible to the actual PN spreading code on the received signal (code tracking requires early and late combinations of a PN code, however this is not shown).

The data is then summed or low-pass filtered by summers 424 and 425, respectively. In the particular implementation shown, the summers perform sums over one millisecond which coincides with the length of the CA code's 1023 chip repetitive PN sequence (1023 chips with a 1.023 MHz chip rate yields a 1 millisecond span). Each summer accumulates and dumps its output. The in-phase output 426 is designated $I_p^{1ms}$ and the quadrature phase output 427 is designated as $Q_p^{1ms}$ where the superscript '1 ms' indicates that summation is over one millisecond and the subscript 'p' indicates that this is the prompt channel (the channel relevant to carrier phase tracking).

It is often advantageous, at least for the purpose of recovering the navigation data bits, to increase the duration of the summations to span 20 ms which is the length of one navigation data bit. There should be no 180 degree phase shifts over the data bit's duration. Additional, but optional, summers 434 and 435 serve the purpose of continuing the sum for one data bit's duration and the Bit Synchronizer 436 controls the start and stop of the summers 434, 435 to coincide with the bit edge. The result is an in-phase bit aligned signal 436 denoted as $I_p^{Bit}$ and is quadrature counter part $Q_p^{Bit}$ 437, respectively. The in-phase component, $I_p^{Bit}$, is actually the demodulated navigation data bit. It is noteworthy to appreciate that in practice, this demodulated navigation data bit $I_p^{Bit}$ Bit can take on a sign opposite that of the true navigation data bit. However, the sign reversal is readily corrected with the parity algorithm specified in the ICD-GPS-200. The sign reversal, should it arise, is precisely a consequence of using a Costas loop with its potential for ½ cycle phase offset. The sign reversal remains for all arriving demodulated data bits until such a time that the track loop undergoes stress and slips back to the true ½ cycle phase alignment.

Continuing with FIG. 3, the carrier discriminator block 450 serves the purpose of producing a measure of the misalignment of the phase of the reference NCO signal 407 with the phase of the arriving carrier signal at the IF frequency. The measured phase error 451 is positive when the reference NCO phase is lagging the incoming carrier, negative when the NCO phase leads and zero otherwise. Furthermore, it has the property that its magnitude is roughly proportional to the magnitude of the true phase tracking error. A common Carrier Discriminator (CD) function is $$CD=Q_p \text{sign}(I_p)$$

where the sign( ) function takes the arithmetic sign (+1 or −1) of the enclosed argument which, in this case, is the sign of $I_p$. Another common discriminator function is $$CD=\text{Tan}^{-1}(Q_p/I_p)$$

Many discriminator functions are known and may readily be found in literature. Regardless of which is chosen, all serve the purpose of acting as a measure of phase tracking error. When the discriminator hovers around zero, the in-phase cosine signal 407 is properly aligned with the incoming carrier.

In FIG. 3, in an exemplary embodiment, the carrier discriminator block is shown to use the in-phase data 436 and quadrature phase data 437 ($I_p^{Bit}$ and $Q_p^{Bit}$) which are aligned to the navigation data bits and summed over 20 milliseconds. It should be appreciated that this approach is just one possibility. It is also possible to supply the discriminator with in-phase and quadrature-phase data has been summed over intervals of less then 20 milliseconds' duration. For example, the one millisecond summations $I_p^{1ms}$ and $Q_p^{1ms}$ may be used instead. It is for this purpose, that pickoff points 426 and 427 are depicted. Once again, it should be appreciated that numerous other possibilities exist as well. Of course, it is advantageous that the summing duration is selected as a multiple of one millisecond (the CA code repetition rate) when tracking the L1 carrier using the CA code. It is advantageous, in fact, to operate the track loop at a one millisecond update rate but run the in-phase summer from one to 20 milliseconds taking always the most recent sum for computing the carrier discriminator value each millisecond. The in-phase summer starts at the data bit edge transition and continues summing to the end of the data bit, in this instance, 20 milliseconds later. The in-phase sum, when operated in this manner, provides an increasingly better estimate of the sign of the data bit, thus slightly reducing the chance of ½ cycle slips.

To facilitate further discussion and simplify the notation, henceforth, the superscripts denoting the duration of summation (such as bit and 1 ms) will be dropped with the understanding that a number of different durations are possible. The in-phase and quadrature phase data will be referred to simply as $I_p$ and $Q_p$ hereafter.

Returning now to FIG. 3, the carrier tracking filter 452 takes the CD output denoted by reference numeral 451 as an input and produces an NCO stepping value 453 that is integrated (or summed) by the NCO 406 to produce an NCO phase 460. The carrier tracking filter is often a Type 2 filter, also known as a proportional-plus-integral (PI) filter or lead-lag filter, although other control schemes are certainly possible. The carrier tracking filter commands the carrier NCO 406 and eventually zeroes out the phase error at which point the CD output is essentially zero (or at least zero plus perhaps small tracking errors caused by rapid receiver or clock motion and noise effects).

The NCO's phase 460 is tapped off and sampled at a regular interval, say for example, every $\frac{1}{20}^{th}$ of a second. Since the NCO phase is aligned to the arriving carrier phase by the track loop, the NCO phase provides a measure of the arriving carrier phase. This measure, termed the carrier phase observable, is used for carrier phase positioning, such as for example, an attitude system that calculates heading, pitch, and roll.

One thing that is evident, upon examination of the mathematical equations governing the carrier discriminators, is that if both $I_p$ and $Q_p$ were to change sign, the discriminator output CD would remain unaffected since the change in sign cancels in the product (or quotient) of $I_p$ and $Q_p$. This is the desired effect of a Costas loop and results in an immunity of the Costas loop to the sign of the navigation data bit, which jointly effects the signs of both $I_p$ and $Q_p$. Otherwise, as for example if a simple PLL was used, every time the navigation data bit changed sign, the loop would react in an undesirable fashion by attempting to track the instantaneous 180 degree phase reversals, and likely the loop would behave erratically.

However, the benefit of a Costas loop of the prior art is also its disadvantage when one desires to recover the phase of the carrier without introducing a ½ cycle ambiguity. Returning to FIG. 3, it should be noted that a 180 degree shift in NCO phase will invert the sign of both the cosine term 407 and the sine term 408 ultimately resulting in a sign reversal for both $I_p$ and $Q_p$. If the NCO undergoes a phase shift of 180 degrees, the Costas loop, by itself, has no means to recognize the phase shift. When the Costas loop is stressed, perhaps by noisy data or signal fades, it may erroneously shift the NCO phase by 180 degrees at which point it may remain locked to the 180 degree shift. In the case of GPS, it is possible to eventually detect the occurrence of a phase shift by monitoring the arriving data bits 436 and by recognizing a discrepancy in the value of those bits whose value is known in advance. The values of bits in the preamble of the GPS message and certain other bits are indeed known in advance. But as mentioned not all data bits are known, so the ½ cycle slip can go undetected for some finite amount of time until known data bits do arrive.

FIGS. 4A-4D shows plots of in-phase and quadrature-phase signals and also shows plots of two carrier discriminators: one for a Costas Loop and one for a standard PLL. All signals are plotted as a function of the phase error 501, this phase error is defined as phase error=(carrier phase of received signal)−(phase of NCO).

Figure 4A:
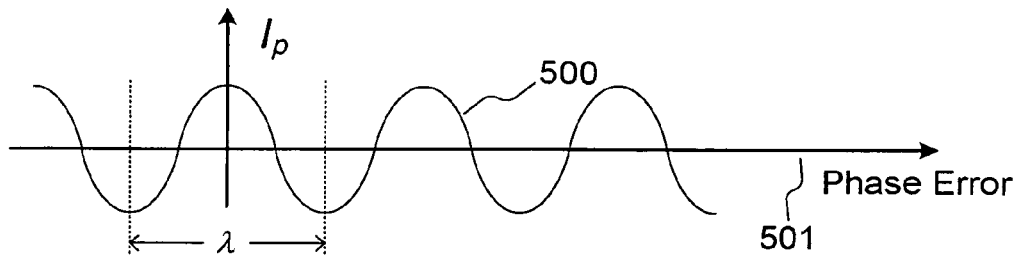
FIG. 4A shows true carrier phase error versus the in-phase signal.
Figure 4B:
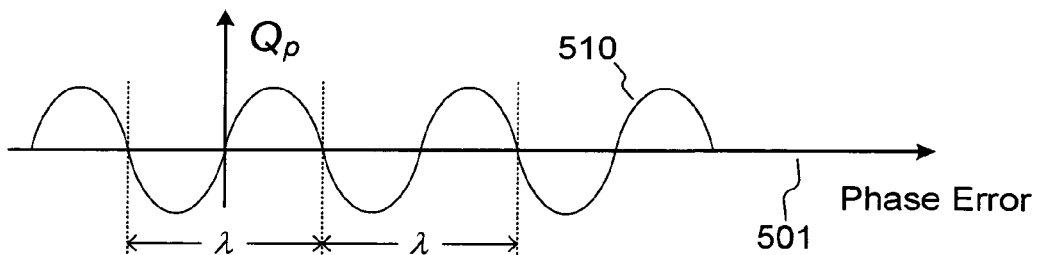
FIG. 4B shows true carrier phase error versus the quadrature-phase signal.
Figure 4C:
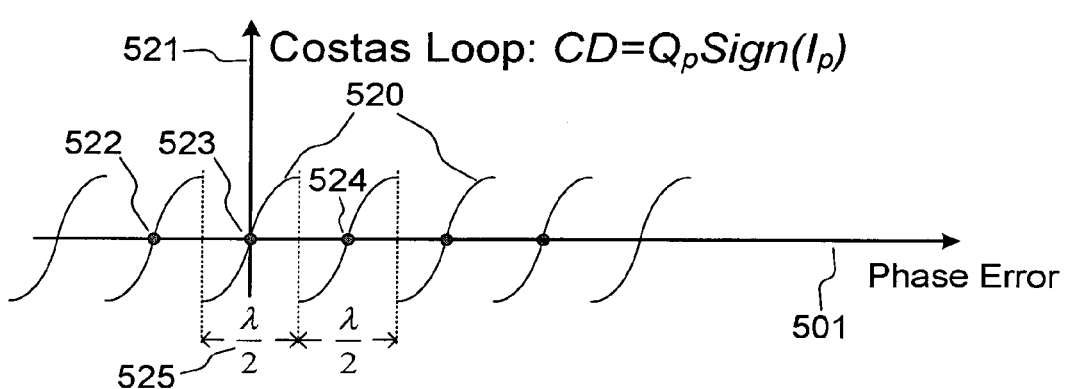
FIG. 4C shows a carrier discriminator for a Costas loop.

FIG. 4A shows the in-phase component $I_p$, 500, which is periodic over the carrier's wavelength, λ. FIG. 4B shows the quadrature phase component $Q_p$, 510, also periodic with period λ. FIG. 4C plots the carrier discriminator, CD=$Q_p$ sign($I_p$), for a Costas loop. The CD 520 is periodic with period λ/2. Tracking can occur at any zero crossing of the CD function, such as 522, 523, and 524, all of which are separated from one another by λ/2. Tracking-loop feedback control is in the correct direction when the CD function 520 is positive to the right of the zero crossing and negative to the left. Each zero crossing, for example 523, is thus a stable track point. Track point 523 remains a stable track point so long as the tracking error does not exceed the pull-in-zone 525 of width λ/2. If error exceeds the pull-in-zone 525, the NCO phase may "slip" so that a new track point is established, such as depicted at 522 or 524. This is the phenomenon that results in the ½ cycle ambiguity of a Costas loop. Similar arguments hold for other implementations of Costas loop discriminators, such as CD=Tan$^{-1}$($Q_p/I_p$).

Figure 4D:
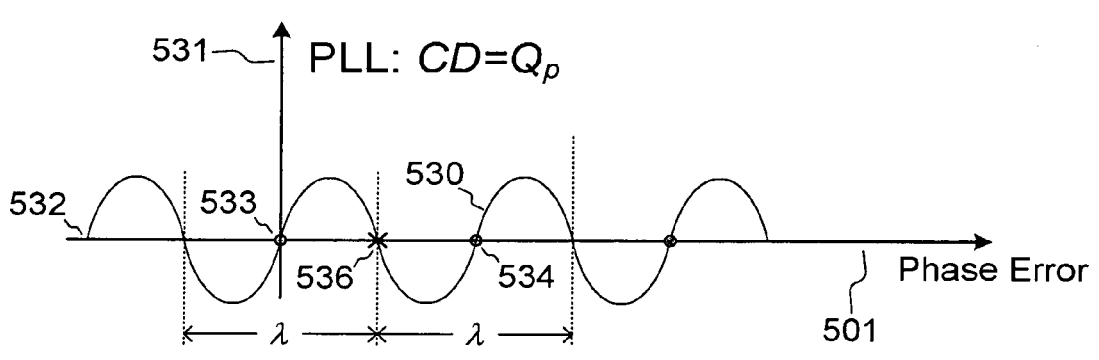
FIG. 4D shows a carrier discriminator for a conventional Phase Lock Loop.

A conventional (non Costas) PLL is shown in FIG. 4D using the simple carrier discriminator, CD=$Q_p$. The CD 530 is periodic with a period of λ. Zero crossings 532, 533, and 534 are stable track points also separated by λ. A zero crossing such as 536 is not a stable track point since it does not meet the condition that CD is positive to the right and negative to the left. Phase errors in the vicinity of 536 will be driven to either 533 or 534 by the feedback control. Thus, the pull-in-zone 535 is of width λ which is twice the width of that of the Costas loop. Therefore, is becomes evident that a conventional PLL is less apt to cycle slip due to the wider pull-in-zone. Furthermore, it cannot exhibit a ½ cycle ambiguity since it tracks only to integer cycles. Unfortunately, a conventional PLL only works when the carrier signal is not modulated by unknown data, as is the case with GPS broadcast signals.

One way to achieve the benefits of a conventional PLL when employing a Costas loop is to know the sign of the modulating data in advance. It is then possible to use the discriminator CD=$Q_p$sign($I_{data}$)

where $I_{data}$ is defined as having the known sign of the modulating data. Since $I_{data}$ is not a function of phase track error, the CD only depends on the term $Q_p$ and is thus similar to a conventional PLL discriminator in this respect. For example, the PLL discriminator shown in FIG. 4D is dependant only on $Q_p$. A Costas loop employing the above carrier discriminator behaves like a PLL and thus has a pull-in-zone of width λ rather than a width of λ/2.

It is worth noting that even if the sign of $I_{data}$ is inverted so that it is opposite that of the true data, the Costas loop will simply undergo a onetime shift in phase of ½ cycle to negate the sign mismatch, but will then exhibit properties similar to those experienced when using the actual sign of the data.

Consequently, the following discriminator also enables a Costas loop to behave like a conventional PLL, albeit with inverted data output.

$$CD = Q_p \text{sign}(-I_{data})$$

Figure 5:
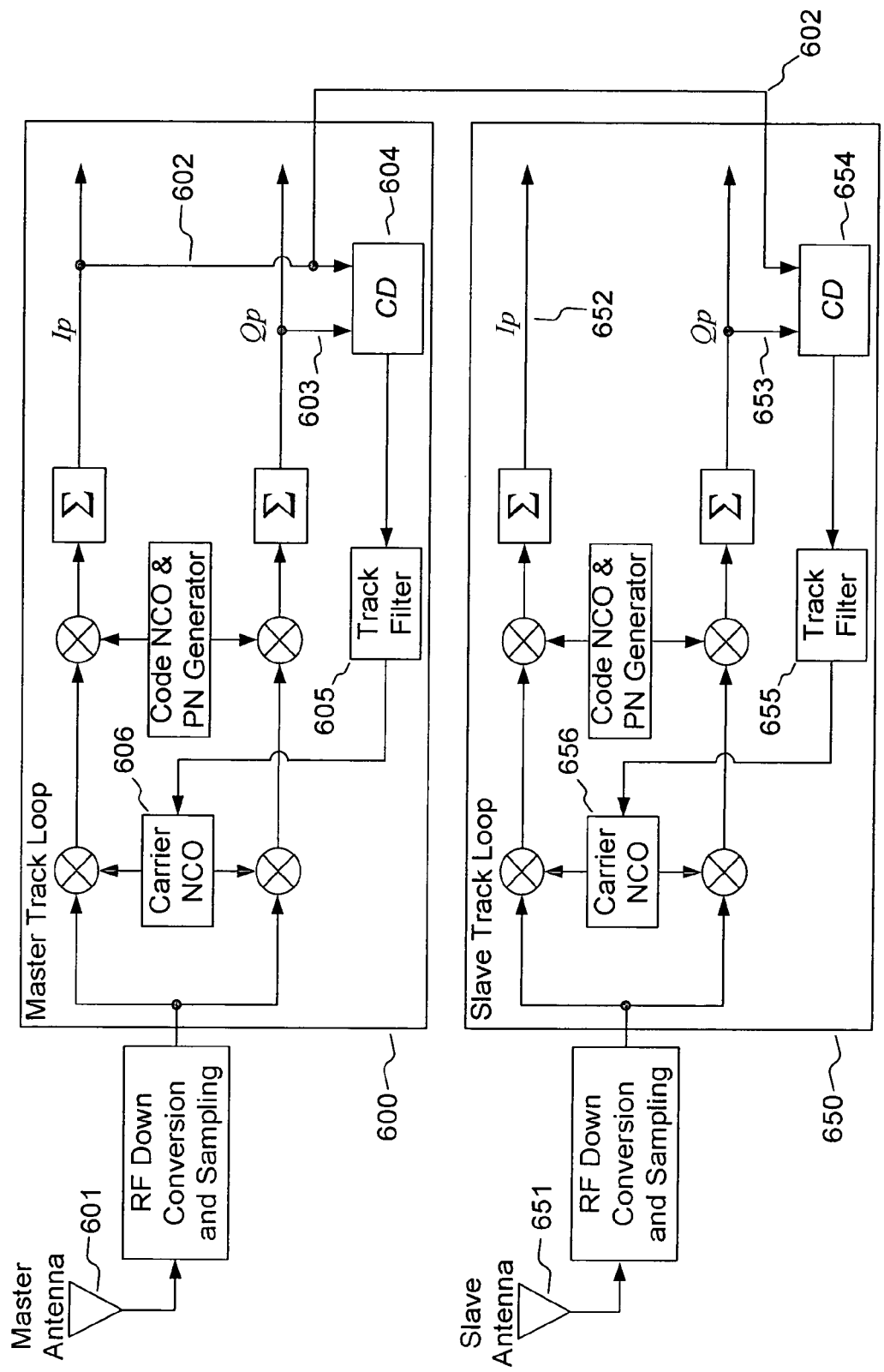
FIG. 5 is a block diagram of master and slave carrier phase track loop that share the master's in-phase data in accordance with an exemplary embodiment.

Referring now to FIG. 5 depicting two tracking loops 600 and 650 in accordance with an exemplary embodiment. The master tracking loop 600 is connected to a master antenna 601 while the slave tracking loop 650 is connected to a slave antenna 651. Both tracking loops employ a Costas loop. The carrier discriminator 604 in the master tracking loop is supplied both $I_p$ and $Q_p$ (602 and 603) both of which originate from the master tracking loop 600. The carrier discriminator output is fed to the track filter 605 which commands the NCO 606. The master track loop is substantially the same in concept, as the track loop described previously and shown as FIG. 3.

The slave track loop 650 has a subtle difference, however. Its own $I_p$ data 652 is not fed to the salve carrier discriminator 654, but rather, $I_p$ data 602 from the master track loop 600 is used in its place. The slave carrier discriminator 654 still makes use of its own $Q_p$ data 653. As with the master, the slave track filter 655 drives the carrier NCO 656 of the slave tracking loop 650.

Mathematically, the master and slave discriminators are $$CD_{master} = Q_{master} \text{sign}(I_{master})$$

$$CD_{slave} = Q_{slave} \text{sign}(I_{master})$$

Where we have adopted the following notation:
$I_{master}$ is the in-phase data from the master track loop;
$Q_{master}$ is the quadrature-phase data from the master track loop;
$I_{slave}$ is the in-phase data from the slave track loop; and
$Q_{slave}$ is the quadrature-phase data from the slave track loop.

Now consider the slave's carrier discriminator $$CD_{slave} = Q_{slave} \text{sign}(I_{master})$$

Clearly, $CD_{slave}$ depends only on the slave track loop through the quadrature-phase component, $Q_{slave}$. For sign compensation, it no longer depends on its own in-phase component, $I_{slave}$, but instead has an external dependence on the master's in-phase component, $I_{master}$. As a consequence, the slave track loop 650 behaves more like a conventional PLL than a Costas loop. This is readily seen if you consider a carrier discriminator that uses the sign of the actual data $$CD_{slave} = Q_{slave} \text{sign}(I_{data}).$$

If $I_{master}$ is taken as the true value of the data ($I_{master} = I_{data}$), then the conventional PLL behavior is evident. The master's in-phase data does indeed maintain the same sign (or maintains consistent opposite sign) as the true data bits due to the nature of its Costas tracking loop. Furthermore, the data bits within the satellite broadcast signal arrive at master and slave antennas at substantially the same time as compared to the width of a data bit. When antennas are spaced apart by less than several meters (as they will be in a typical attitude determination device), the arrival time difference between master and slave data bits is less than ten nanoseconds, which is insignificant compared to the 20 millisecond data bit duration. Thus, as long as $I_{master}$ maintains a consistent sign or consistent opposite sign to the true data, the pull-in-zone for the slave is widened from $\lambda/2$ to $\lambda$.

In practice, the master track loop 600 will sometimes slip. If it slips ½ cycle (or any integer number of cycles plus ½ cycle), the slave control loop 650 will react by steering its NCO phase to an offset of ½ cycle to compensate for the sign reversal of $I_{master}$. This is exactly the behavior that is desired for an attitude determining device, since ½ cycle phase offsets of the master e.g., 202, 600 and slave e.g., 203, 204, 650 are kept identical by the disclosed scheme. As such, any ½ cycle phase offsets will cancel in the difference between master and slave carrier phase. The carrier phase difference will only exhibit whole integer cycle phase ambiguities. Whole cycles are much easier to deal with than ½ cycles both in terms of estimating the ambiguities and when detecting cycle slips that may sometimes occur. Consequently, coupling the master's in-phase data 602 to the slave's carrier discriminator 654 yields a significant advantage.

Figure 6:
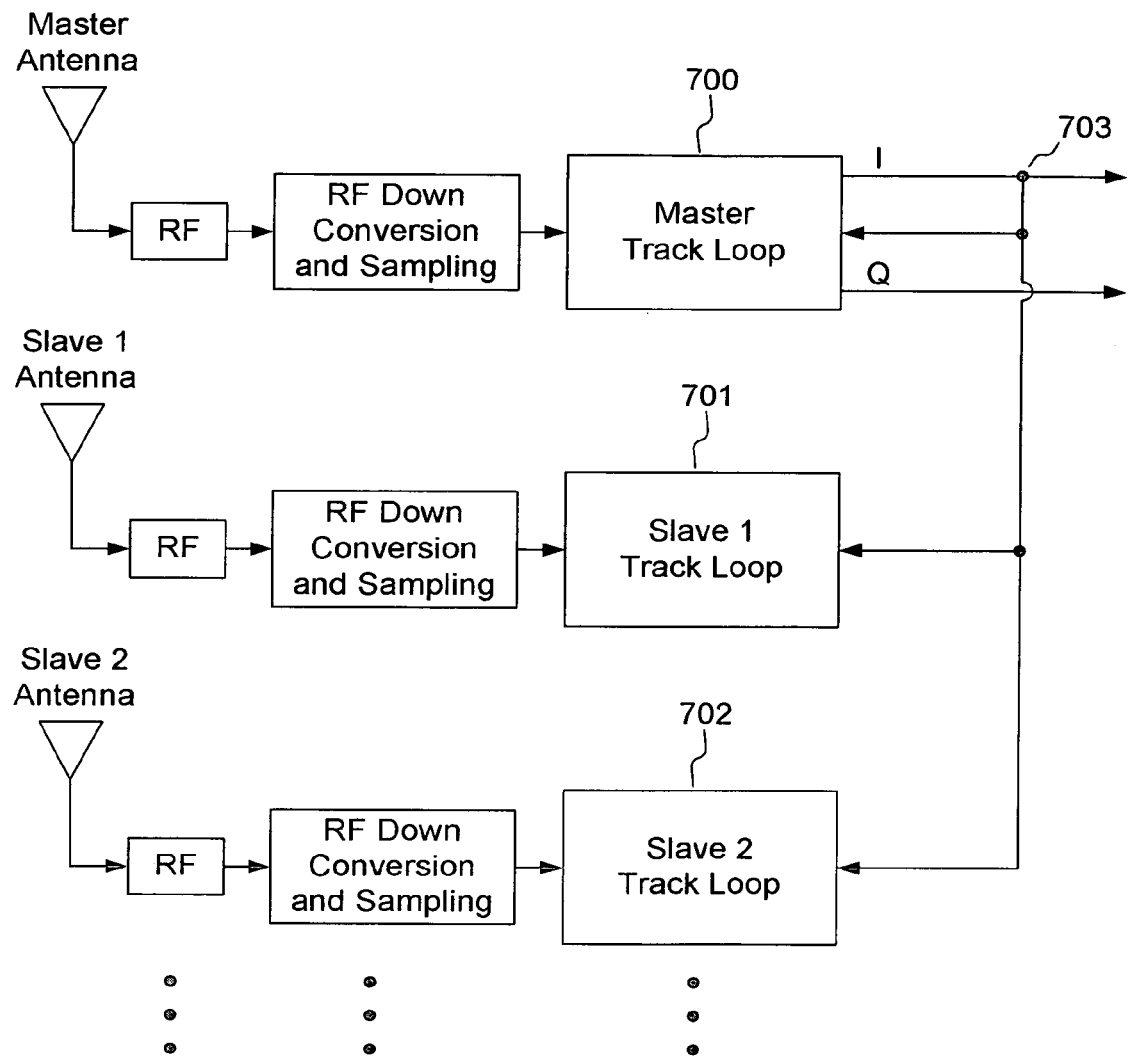
FIG. 6 is a block diagram showing multiple slave carrier phase trackers sharing data from a single master carrier phase tracker.

FIG. 6 is a simplified block diagram depicting an implementation of the methodology and apparatus of FIG. 5; however, in this instance, two or more slave systems are depicted rather than one. In this figure, the master track loop 700 supplies its in-phase data, denoted in the figure by reference numeral 703 to its own CD and to the CDs of slave tracking loop 701 and slave tracking loop 702. Any number of slave track loops may be augmented by applying the in-phase term from a single master to each of the slave carrier discriminators. All slaves will thus maintain a ½ cycle alignment with the master. The differential carrier phase between master and slave or, for that matter any slave pair, will be free of ½ cycle ambiguities.

In some attitude systems it is advantageous to not only deliver the in-phase data from the master tracking loop, e.g., 700 to the slave track loops, e.g., 701, 702, but share other track loop data as well. For example, when the master and slave antennas undergo motion that exhibits concurrent or similar dynamics, the tracking loops preferably need to react similarly and sharing of data between track loops is beneficial. In particular, in an attitude or heading system that experiences high translational accelerations (such as when mounted on an aircraft) but low rotational accelerations, it is likely that the dominant translational accelerations are seen by all antennas nearly equally. Track loops receiving data from each antenna should react nearly identically to track the common carrier phase accelerations.

In another situation, there may be minute physical accelerations experienced at the antennas, as for example, when a heading device is mounted on a large ship. Even if physical accelerations are small, the receiver's own oscillator undergoes frequency perturbations that result in apparent carrier phase accelerations. However, the oscillator is shared between master and slave tracking modules and the oscillator induced accelerations will be identical across each track loop.

As a solution of the aforementioned problem, in another exemplary embodiment, carrier phase tracking errors are summed (or averaged) and supplied to a responsive, high-bandwidth track loop filter that is shared among track loops. A lower bandwidth filter that is independent for each track loop, is utilized to track the slower but non-common dynamics using the individual phase errors of each system. A shared high-bandwidth track loop is employed to dominate the high frequency and noise response. As such, the noise induced into the individual carrier phase measurements will be similar and will cancel in the carrier phase differences that are formed as part of the attitude solution. This, advantageously, results in smoother differential carrier phase observations and ultimately attitude angles that are smoother as well.

Figure 7:
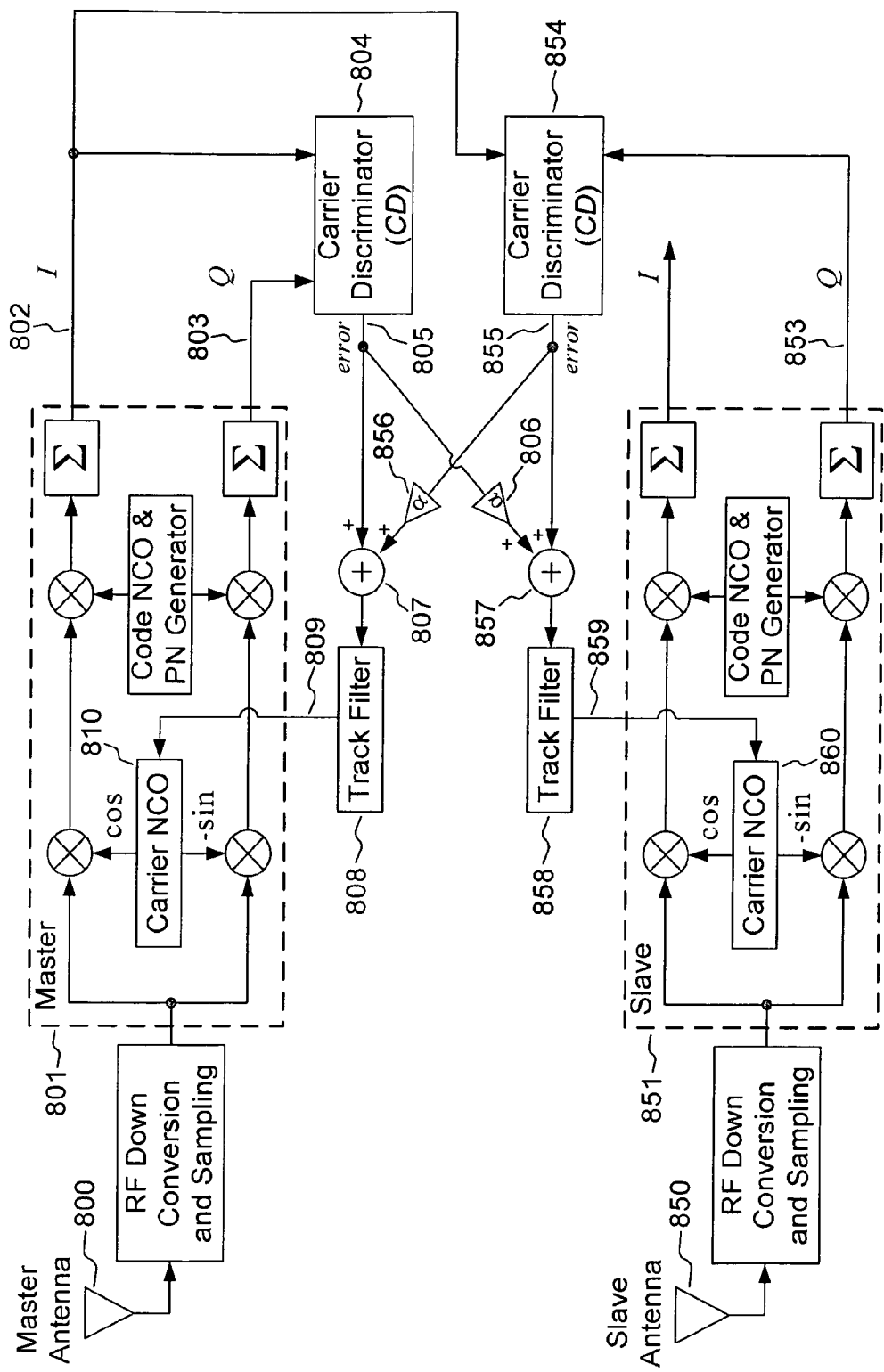
FIG. 7 is a block diagram depicts sharing of data between the Master and Slave carrier phase filters in accordance with an exemplary embodiment.

FIG. 7 shows an exemplary embodiment of a multiple track loop receiver system utilizing not only a shared in-phase component, but shared carrier discriminator outputs as well. A master track signal processor 801 and a slave track signal processor 851 receive carrier data from antennas 800 and 850, respectively. As per the methodology described above, the in-phase data 802 for the master tracking loop 801 is delivered to both master and slave carrier discriminators 804 and 854 respectively, so that ½ cycle phase tracking alignment can be realized. Master carrier discriminator 804 computes a phase error 805 and slave carrier discriminator 854 computes a phase error 855. Each phase error is proportional to the difference of the respective NCO generated phase and the carrier phase of the received signal.

Uniquely in this embodiment, phase tracking errors 805 and 855 of the master and slave, respectively, are each coupled to both track loops. Phase error 805 is fed to a summer 807 where it is added to phase error 855 that has been multiplied by a scale factor α using amplifier 856. Similarly, phase error 855 is fed to a summer 857 where it is added to phase error 805 that has also been multiplied by α using amplifier 806. The value α of amplifiers 806 and 856 is identical in this embodiment, however, other values may be employed. The summed signal produced by summer 807 is fed to the track filter 808 for the master tracking loop 801, which is either a proportional plus integral filter or some other track filter that results in a stable feedback control. The track filter 808 then delivers the NCO step 809 to the carrier NCO for the master tracking loop 801. Similarly, the summed signal produced by summer 857 is fed to the track filter 858 for the slave tracking loop 851, again, which is either a proportional plus integral filter or some other track filter that results in a stable feedback control. The track filter 858 then delivers the NCO step 859 to the carrier NCO for the slave tracking loop 851.

FIG. 7 depicts an exemplary embodiment of information sharing tracking loops that realizes, for each track-loop, a common high-bandwidth response and an independent low-bandwidth response. In one exemplary embodiment, the value of α is selected to be preferably less than one, but somewhat near to one. The closer alpha is to one, the less independent the track loops become. If α is exactly one, both track loops are supplied exactly the same data and therefore generate the same NCO command. In practice, antennas are typically in separate locations or move separately and therefore require slightly different NCO commands to properly track, thus values other than one are desirable. On the other hand, if the value of α for both is zero, afterward both track loops are completely independent of one another (other than the shared in-phase signal) and each system is similar to that depicted in FIG. 5. It is noteworthy to appreciate that setting α to zero may be advantageous during certain instances of operation. For example, during tracking loop initialization more independence may be desired. Conversely, in steady-state operation, choosing α as some number near to one, such as 0.9, gives a dominant common response, with a less dominant independent response, but still assures some independence of the track loops 801, 851. No matter what α is chosen, track loop filters 808 and 858 are designed so that overall system response is stable and meets system bandwidth and settling requirements.

Figure 8:
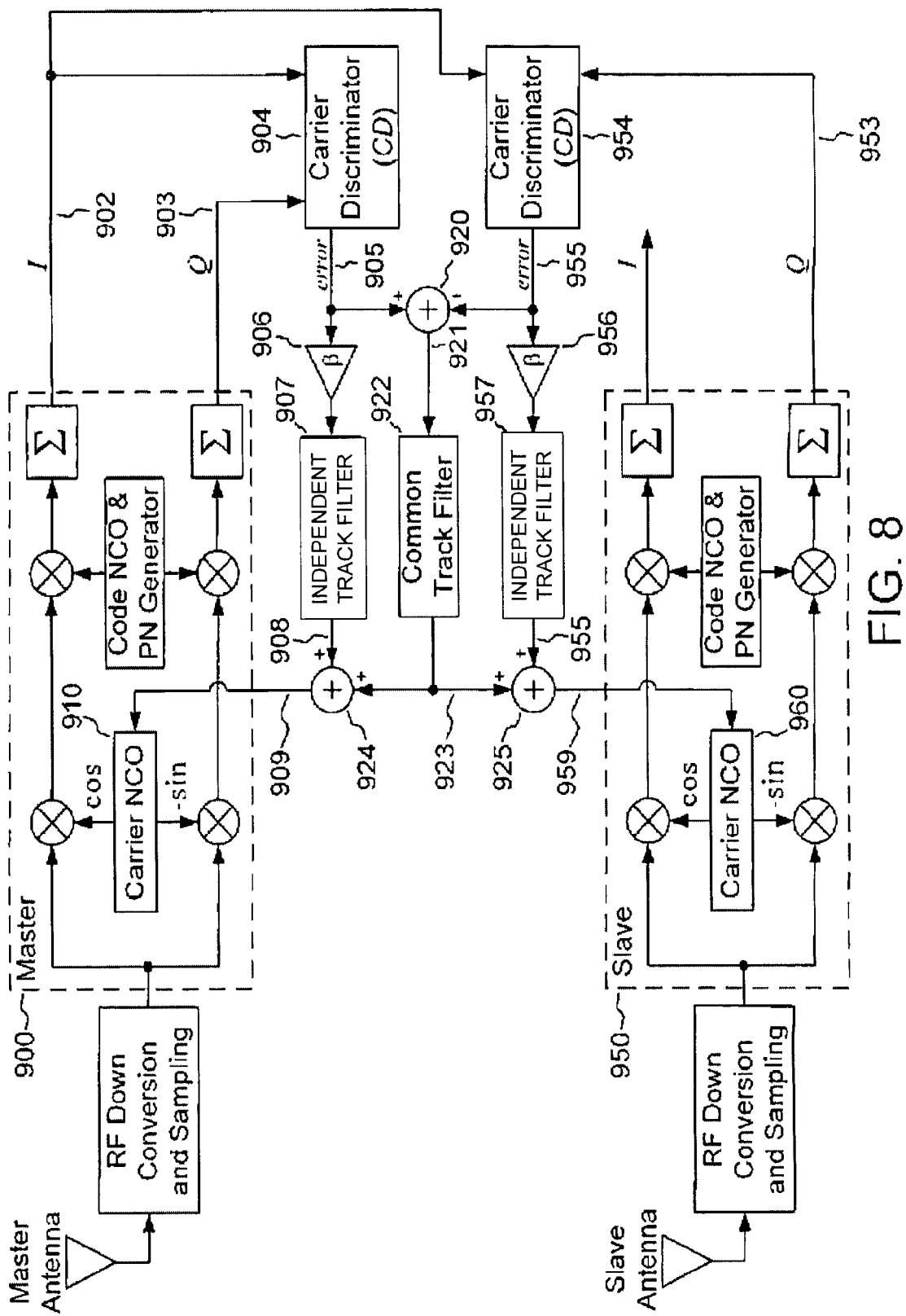
FIG. 8 is a block diagram depicting sharing of data between the Master and Slave carrier phase filters in accordance with another exemplary embodiment.

Continuing now to FIG. 8, a block diagram is depicted of yet another exemplary embodiment exhibiting a more flexible configuration for implementing a common high-bandwidth response and an independent low-bandwidth response. In the figure, a common high-bandwidth track loop filter 922 is completely independent of two individually-steered, low-bandwidth filters 907 and 957 for the master tracking loop 900 and slave tracking loop 950, respectively. Advantageously, with this embodiment tracking loop parameters, such as proportional plus integral gains, may be adjusted independently to give both desired low-bandwidth and desired high-bandwidth responses. It will be appreciated that up to and including the carrier discriminators 904 and 954, the track loops are substantially identical to those shown in FIG. 7. The phase tracking error 905 is proportional to the difference in phase between the phase of the NCO 910 and the carrier phase arriving at antenna for the master tracking loop 900. Similarly, phase tracking error 955 is proportional to the difference in phase between the phase of the NCO 960 and the carrier phase arriving at antenna for the slave tracking loop 950.

Track errors 905 and 955 are summed at 920; the sum 921 is then delivered to the common track filter 922. The common track loop filter has its own set of parameters, such as proportional and integral gains. The output 923 of the common track loop is fed to the master NCO through summer 924 and to the slave NCO through summer 925.

The master's independent track loop filter 907 utilizes only the master's track error 905 which is scaled through the amplifier 906 having a gain of β. Similarly, the slave's independent track loop filter 957 utilizes only the slave's track error 955 which is scaled through amplifier 956 of gain β. In this embodiment, both track loops 907 and 957 employ identical filters (although it will be appreciated that they need not), which are typically adjusted to yield lower bandwidth response than the common track filter 922. The output 908 of the master's independent track filter is added to the common track filter output 923 and fed to the master's carrier NCO 910. The output 958 of the slave independent track filter is added to the common track filter output 923 and fed to the slave's carrier NCO 960. Ultimate track loop response and degree of track loop independence is readily configurable by the designer.

FIG. 7 and FIG. 8 are just two illustrative configurations for realizing carrier track loops that have a common mode noise-induced phase error and common ½ cycle ambiguity, these commonalities canceling when differencing the phase from each NCO. One skilled in the art may readily envision numerous variations and other realizations that would lead to and achieve similar results. Moreover, although this disclosure thus far has made reference to the application of this invention with respect to an illustration as an attitude or heading system, it may readily be applied to a more general class of GNSS devices and applications. One such application would be a local survey system where one antenna is used as a reference and another is used to survey a location relative to a reference. Both antennas of which are connected to a common receiver that maintains tracking of signals arriving at each antenna.

To be consistent with the disclosure herein, the two systems need only ensure that the tracking loops of two or more receivers can share data at a rate consistent with the track loops update rate and that antennas that receive the carrier signals be sufficiently close together so that data bit transitions occur at roughly the same time (e.g., within 10%) relative to the in-phase and quadrature phase accumulation window start/stop times. It will be further appreciated that these constraints may be relaxed if the master and slave tracking loops run in non-real time (perhaps in post processing software) where methods can be applied to share and align data without concern for real-time processing constraints.

Furthermore, pipeline delays can be introduced into a real-time system's data flow so that even when antennas are spaced widely (or signals arrive at different times for other reasons such as hardware or filtering delays), data bit transitions can be aligned between track loops. In many circumstances, different bit arrival times are not an issue, for even if data accumulations occur over windows as small as one millisecond, antenna spacing would have to exceed 30 kilometers before signal travel delays induced a 10% misalignment of the accumulation windows.

It will be evident that there exist numerous numerical methodologies in the art for implementation of mathematical functions, in particular as referenced here, including, but not limited to, linearizations, least squares approximations, filters, Kalman filters, taking maximums, and summations. While many possible implementations exist, a particular method of implementation as employed to illustrate the exemplary embodiments should not be considered limiting.

The system and methodology described in the numerous embodiments hereinbefore provide a system and method of positioning or attitude determination that is effective and advantageously exploits Global Navigation Satellite System (GNSS) signals to infer differential path length of carrier signals arriving at two or more antennas. In particular, the described embodiments provide an improved tracking loop for carrier phase tracking. In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of "first" and "second" or other similar nomenclature for denoting similar items is not intended to specify or imply any particular order unless otherwise specifically stated. Likewise the use of "a" or "an" or other similar nomenclature is intended to mean "one or more", unless otherwise specifically stated.

While the invention has been described with reference to an exemplary embodiment thereof, it will be understood by those skilled in the art that the present disclosure is not limited to such exemplary embodiments and that various changes may be made and equivalents may be substituted for elements thereof without departing from the scope of the invention. In addition, a variety of modifications, enhancements, and/or variations may be made to adapt a particular situation or material to the teachings of the invention without departing from the essential spirit or scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method of reducing Global Navigation Satellite System (GNSS) carrier tracking loop ambiguities comprising:
   receiving a plurality of GNSS satellite signals with a first antenna in operable communication with a first tracking device and a second antenna in communication with a second tracking device in at least one GNSS receiver; and
   sharing of data between said first tracking device and said second tracking device, said sharing configured to facilitate a commonality in a carrier phase derived in said first tracking device and said second tracking device: said sharing resulting in a cancellation in said commonality when a difference phase is formed between a carrier phase from said first tracking device and another carrier phase from said second tracking device.

2. The method of claim 1 wherein said difference phase is single- or double-difference phases corresponding to one or more GNSS satellites for said first tracking device and said second tracking device.

3. The method of claim 2 further including determining at least one of an integer ambiguity value, a position corresponding to said first antenna, or a position corresponding to said second antenna.

4. The method of claim 2 further including determining at least one altitude angle for at least said first antenna and said second antenna.

5. The method of claim 1 wherein said data includes at least one of in-phase data or quadrature-phase data.

6. The method of claim 1 wherein said commonality includes at least one of common mode phase error and common ½ cycle ambiguity for said carder phase derived in each of said first tracking device and said second tracking device.

7. The method of claim 1 wherein at least one of said first tracking device or said second tracking device employs a Costas loop.

8. The method of claim 7 further including ensuring that any cycle slip that arises on a carrier signal tracked from one said first antenna or first tracking device is compensated for the carrier signal tracked for said second antenna or second tracking device.

9. A storage medium encoded with a machine-readable computer program code for reducing Global Navigation Satellite System (GNSS) carrier tracking loop ambiguities, said storage medium including instructions for causing a computing system to implement the method of claim 1.

10. A computer data signal for reducing Global Navigation Satellite System (GNSS) carrier tracking loop ambiguities, the computer data signal comprising code configured to cause a processor to implement the method of claim 1.

11. A system for reducing Global Navigation Satellite System (GNSS) carrier tracking loop ambiguities comprising:
   a first antenna in operable communication with a first tracking device configured to receive a plurality of GNSS satellite signals:
   a second antenna in communication with a second tracking device configured to receive a plurality of GNSS satellite signals: said first tracking device and said second tracking device in at least one GNSS receiver: and
   wherein said first tracking device and said second tracking device are configured to share data between said first and second tracking devices to facilitate a commonality in a carrier phase derived in said first tracking device and said second tracking device and resulting in a cancellation in said commonality when a difference phase is formed between a carrier phase from said first tracking device and another carrier phase from said second tracking device.

12. The system of claim 11 wherein said difference phase is single- or double-difference phases corresponding to one or more GNSS satellites for said first tracking device and said second tracking device.

13. The system of claim 12 wherein at least one of said first tracking device or said second tracking device is configured to facilitate determining at least one of an integer ambiguity value, a position corresponding to said first antenna, or a position corresponding to said second antenna.

14. The system of claim 12 wherein at least one of said first tracking device or said second tracking device is configured to facilitate determining at least one attitude angle based on known geometry constraints for at least said first antenna and said second antenna.

15. The system of claim 11 wherein said data includes at least one of in-phase data or quadrature-phase data.

16. The system of claim 11 wherein said commonality includes at least one of common mode phase error and common ½ cycle ambiguity for said carrier phase derived in each of said first tracking device and said second tracking device.

17. The system of claim 11 wherein said first tracking device and said second tracking device are established as a master tracking device and slave tracking device respectively in that said slave tracking device receives said data from said master tracking device.

18. The system of claim 11 wherein at least one of said first tracking device or said second tracking device employs a Costas loop.

19. A system for reducing Global Navigation Satellite System (GNSS) carrier tracking loop ambiguities comprising:
   means for receiving a plurality of GNSS satellite signals with a first antenna in operable communication with a first tracking device and a second antenna in communication with a second tracking device in at least one GNSS receiver: and
   means for sharing of data between, said first tracking device and said second tracking device, said sharing configured to facilitate a commonality in a carrier phase derived in said first tracking device and said second tracking device; said sharing resulting in a cancellation in said commonality when a difference phase is formed between a carrier phase from said first tracking device and another carrier phase from said second tracking device.

20. A method of reducing half cycle ambiguities or cycle slips in GNSS differential carrier phase determinations comprising:
   designating a first tracking device as a master tracking device;
   designating a second tracking device as a slave tracking device;
   sharing information between Costas tracking loops of said master tracking device and said slave tracking device; said slave tracking device driven by a carrier discriminator employing in-phase data from said master tracking device in place of internally generated in-phase data.

* * * * *